Jan. 19, 1965     T. M. HOLLOWAY     3,166,085
PNEUMATIC RELAYS
Filed Nov. 6, 1961     2 Sheets-Sheet 1
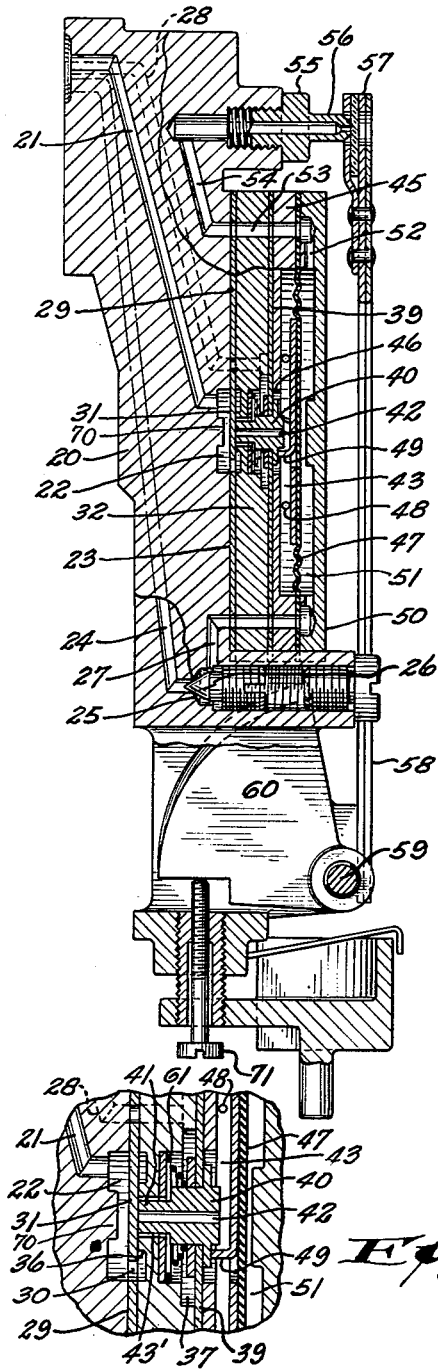
Fig. 1.
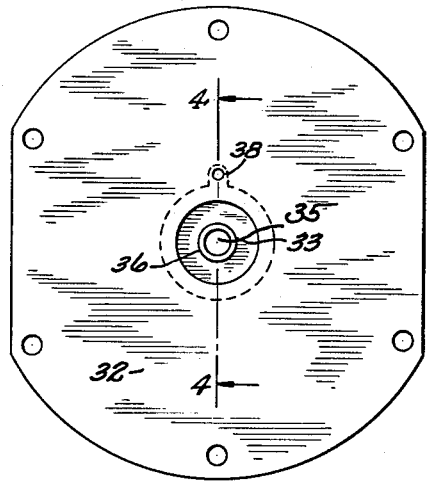
Fig. 3.
Fig. 4.
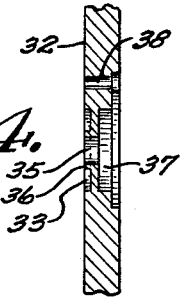
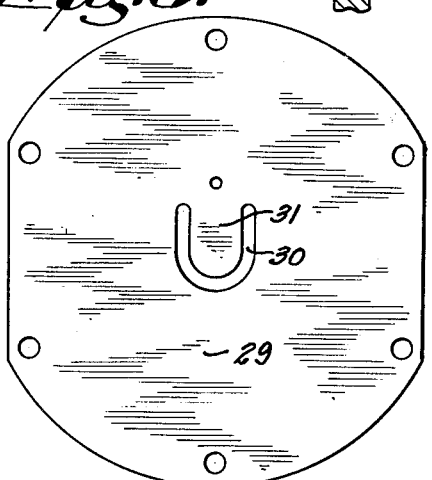
Fig. 5.
Fig. 9.
INVENTOR.
THOMAS M. HOLLOWAY
BY
ATTORNEYS.

Jan. 19, 1965 T. M. HOLLOWAY 3,166,085
PNEUMATIC RELAYS
Filed Nov. 6, 1961 2 Sheets-Sheet 2

INVENTOR.
THOMAS M. HOLLOWAY
BY
ATTORNEYS.

United States Patent Office 3,166,085
Patented Jan. 19, 1965

3,166,085
PNEUMATIC RELAYS
Thomas M. Holloway, Waukesha, Wis., assignor to Johnson Service Company, Milwaukee, Wis., a corporation of Wisconsin
Filed Nov. 6, 1961, Ser. No. 150,356
5 Claims. (Cl. 132—82)

This invention relates to improvements in pneumatic relays.

In Otto Patent No. 1,500,260, there is disclosed a pneumatic relay of the general type with which the present invention is concerned. In this prior patent, however, a conical valve is utilized to provide two seals. One of these seals controls communication between atmospheric pressure and the output air pressure in the branch conduit. Another seal controls communication between the supply air and the output air. This conical valve is capable of closing both seals simultaneously, or of allowing communication between the output air chamber and atmosphere while preventing flow of the supply air, or of allowing flow of supply air into the output air chamber while cutting off communication with the atmosphere. This conical valve is so constructed that it cannot open both the seal between the supply air and the branch air and the seal between the branch air and the atmosphere simultaneously. This conical valve must be used in connection with a space occupying spring and nut assembly, which spring normally urges the valve toward seating position.

While the relay shown in the prior Otto Patent No. 1,500,260 has been satisfactory, nevertheless, certain trends in the industry demand designs which require less space and less manual labor in assembly. In the Otto design, the conical valve, spring and nut, take up considerable space in the depth or thickness of the relay.

It is the general object of the present invention to provide an improved pneumatic relay in which there is novel arrangement used which eliminates the necessity of using the conical valve and spring of the Otto patent, and which functions efficiently while making it possible to produce a relatively thin and compact relay.

A further object of the invention is to provide a pneumatic relay having novel valve mechanism which may be easily assembled and which saves expense in both parts and labor. Part of the saving in labor is accomplished because of the use of a novel flat diaphragm with an integral flap valve together with an associated output plate. These may be installed in the same operation as the coordinating plates and coordinating diaphragms. Thus the assembly operation is simple, less costly and takes less time.

With the above and other objects in view, the invention consists of the improved pneumatic relay, and all of its parts and combinations, as set forth in the claims, and all equivalents thereof.

In the accompanying drawings, illustrating several embodiments of the preferred form of the invention, in which the same reference numerals designate the same parts in all of the views:

FIG. 1 is a longitudinal sectional view through the relay taken along line 1—1 of FIG. 2, parts being broken away;

FIG. 3 is a plan view looking at the inner face of the output plate;

FIG. 4 is a sectional view taken along line 4—4 of FIG. 3;

FIG. 5 is a plan view of one form of flapper valve diaphragm;

FIG. 9 is an enlarged sectional view showing the central air chambers adjacent the valve of FIG. 1.

Figure 2:
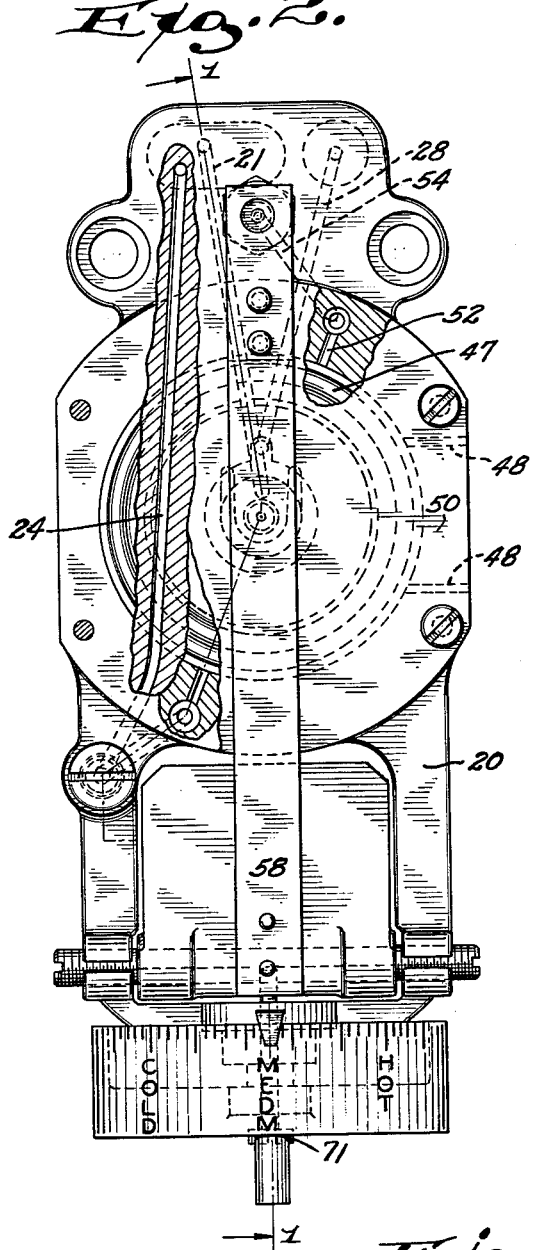
FIG. 2 is a front view of the relay of FIG. 1, parts being broken away and shown in section.

Referring more particularly to the drawings, the numeral 20 designates a housing having a supply air duct 21 therein leading to a recess 22 in a housing face 23. There is also a second duct 24 for supply air leading to a restrictor valve chamber 25. A needle valve 26 can be adjusted to control the flow of supply air from the duct 24 into a conduit 27. The housing 20 has an output air or branch duct 28 adapted to lead to a device to be controlled.

Positioned against the face 23 of the housing is a flat flexible diaphragm 29 (see FIG. 5) having a central U-shaped slot 30 defining an integral flexible central valve flap 31. The diaphragm 29 may be made of any suitable flexible material. It is preferred, however, to have it made of a relatively soft flexible material to ensure tight seating. Rubber, "neoprene," "Buna-N" or other synthetic rubber-like materials are very satisfactory. The construction is such that, because of the inherent flexibility of the material, the flap tends to seat itself with the assistance of the supply pressure in chamber 22, the stop projection 70 limiting the stroke of possible flexing of the flap 31 to such a limited extent as to prevent the flap 31 from being folded backwards to a position where it might be held open due to a sudden drop in supply air pressure. Thus, the shallowness of the chamber 22, as brought about by the position of the stop 70, assures that the supply pressure in the chamber 22 always maintains the flap in seating position with respect to the port 42 in the fitting 40, or in seating position on the seat 36. When air is being supplied by the relay the flap will only be seated against the port 42. When exhausting, the flap will only be seated against the seat 36. In the balanced position it will be seated on both 42 and 36.

Secured against the outer side of the diaphragm 29 is an output plate 32 (see FIG. 3), preferably of metal. This plate preferably has a central circular recess 33 which only extends a short distance into the metal, as shown in FIG. 4. In the center of the recess 33 is a valve opening 35 which is surrounded by an annular seat 36, the latter being positioned to co-act with the valve flap 31 to control communication with the valve opening 35. Valve opening 35 leads to an enlarged recess on the other side of the output plate forming an output air chamber 37 which is in communication through a port 38 with the output or branch line 28, as is clear from FIGS. 1 and 4.

Positioned against the outer side of the output plate 32 is an intermediate diaphragm 39 carrying a central exhaust fitting 40. The latter has a stem 41 which fits within the valve opening 35 of the plate, there being an axial exhaust duct 42 extending longitudinally through the fitting and its stem, which duct communicates with an exhaust chamber 43. There is clearance 43' around the stem 41 of the fitting 40 whereby there may be communication between the supply chamber 22 and the output chamber 37 when the valve flap 31 is not seated on the seat 36, and also to provide for communication between the output air chamber and the atmosphere, through the exhaust chamber 43, when the parts are in a different position, as will be hereinafter described. The exhaust chamber is formed within a plate 45 which is positioned against the outer portion of the diaphragm 39 and which has a central opening 46 receiving the fitting 40. An outer diaphragm 47 is spaced outwardly from the diaphragm 39, with the exhaust chamber 43 therebetween, there being exhaust ports 48 in the plate 45 leading to the atmosphere. The diaphragm 47 has inwardly projecting central fingers 49 which are adapted to bear against the central exhaust fitting of the diaphragm 39. The front of the device is closed by another plate 50, there being a pilot air chamber 51 between the plate 50 and the diaphragm 47.

In addition, there is a radial duct 52 leading from the pilot air chamber 51 and communicating through ducts 53 and 54 with a leakport fitting 55 having a discharge nozzle 56 which is controlled by a lid 57. The latter is associated with a bimetallic element 58 suitably pivoted as at 59 and counter-weighted as at 60. This is responsive to temperature changes in the same way as the lid of the prior Otto patent to control the escape of air from the leakport nozzle 56, and the counter-weight may be adjusted through the screw 71.

Operation

In operation, the supply air enters through the duct 21 to chamber 22. When the parts are in the position of FIG. 1, the chamber 22 is closed by the valve flap 31 as it is seating on the annular valve seat 36. The branch or output air duct 28 is connected through the radial duct 38 with the output air chamber 37. The latter chamber may communicate through the axial duct 42 in the center of the fitting 40 with the exhaust air chamber 43 when the spring 61 in said chamber 37 forces the diaphragm 39 away from the valve flap 31 to open up the end of the axial duct 42 in the stem 41. When this occurs, the output air chamber is in communication with the atmosphere through the ports 48 in the exhaust chamber 43. Thus, when the parts are in this condition, atmospheric pressure also exists in the line 28.

Supply air pressure is supplied to the pilot air chamber 51 through the restrictor arrangement at 25 and through duct 27. The needle valve 26 in the restrictor is so adjusted that, with the leakport 56 wide open (reverse position from FIG. 1), a pressure of 4 to 5 inches of water exists in the chamber 51.

As the leakport 56 is gradually closed, by action of the lid 57, a smaller quantity of air escapes from the pilot chamber 51 and the pressure in this chamber rises. This pilot pressure acting against the outer diaphragm 47 causes it to move to the left, referring to FIG. 1, and through the fingers 49 this movement is transmitted to the intermediae diaphragm 39 and exhaust valve fitting 40 forcing its stem 41 against the flap valve 31, thus closing output air chamber 37 to the atmosphere. This is due to the fact that air can no longer flow through the annular clearance space 43' around the stem 41 to go out of the stem duct 42 into the exhaust chamber 43.

A continued increase in pilot pressure in the chamber 51 causes further movement of the stem 41 to the left, ultimately forcing the valve flap 31 off of its annular seat 36 and allowing supply air to flow through the clearance space 43' into the output air chamber 37. The pressure in the chamber 37 then rises until this pressure, acting against the diaphragm 39, forces the stem 41 to the right and allows the valve flap 31 to flex back into seating engagement with the main valve seat 36.

The relay is now in balanced position with the force exerted by the pilot pressure acting on the diaphragm 47 balanced by both the force exerted by the output pressure in chamber 37 acting on diaphragm 39 and the force exerted by spring 61. Both the main valve seat 36 and the exhaust seat, which is the end of the stem 41, are now closed. Any further increase in pilot pressure would cause a further increase in output or branch pressure in the line 28 until the forces were again in balance.

When the pilot pressure decreases, the force exerted by the output pressure in 37 against the diaphragm 39, plus the force of the spring 61, are greater than the force of the pilot pressure against the diaphragm 47, and the exhaust stem 41 is moved away from the valve flap 31 to allow branch or output air to escape to the atmosphere through the axial duct 42 and through the atmospheric exhaust ports 48. When the branch pressure is reduced to the point where the forces are again balanced, the exhaust seat at the end of the stem 41 again closes against the valve flap 31.

It is apparent from the above that the use of the flexible diaphragm 29 with its central valve flap 31, in conjunction with an outlet plate, as shown in FIG. 4, provides a very simple way of having a single valve which controls two sealing operations. It is also apparent that the flat diaphragm 29 takes up a minimum of space in the thickness of the device. Furthermore, because the flap portion 31 has inherent flexibility, the spring usually employed for a conical valve can be eliminated, thereby saving another part and additional space. Also, the spring-holding adjustment nut of the prior Otto patent can be eliminated. It is also apparent that the assembly of the parts 29 and 32 is very simple and can be done at the same time that the other diaphragms are assembled.

Figure 6:
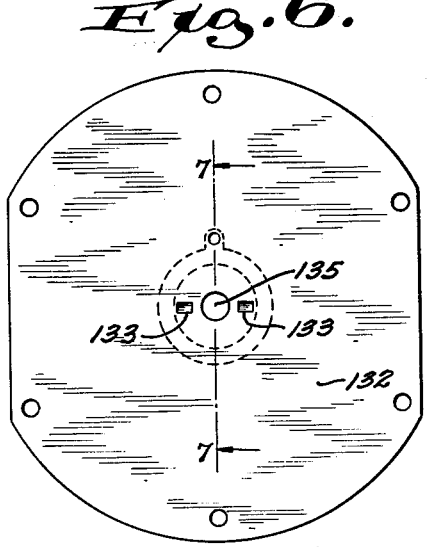
FIG. 6 is a plan view looking at the inner side of a modified output plate.
Figure 7:
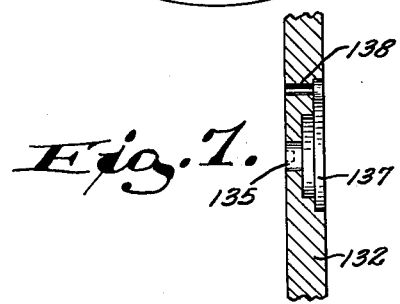
FIG. 7 is a fragmentary sectional view taken along line 7—7 of FIG. 6.
Figure 8:
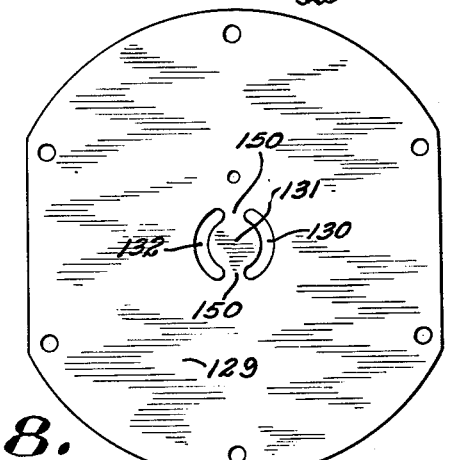
FIG. 8 is a plan view of a modified type of flapper valve diaphragm for use in conjunction with the output plate of FIG. 6.

In the modification of FIGS. 6, 7 and 8, the same numerals are used, preceded by the digit 1. The output plate 132 has a central hole 135 and there are spaced recesses 133 on each side of the hole which extend only part way into the metal. The diaphragm 129 of FIG. 8, instead of having a U-shaped slot to create a valve flap which is loose on one end, has two opposed arcuate slots 130 to leave a valve member 131 therebetween which is, however, flexibly connected at both ends as at 150. With this arrangement, where the valve 131 has no loose end, noise is eliminated, such noise occurring with the form of diaphragm of FIG. 5 in certain designs and uses.

In other respects the diaphragm of FIG. 8 operates the same as the diaphragm of FIG. 5, the valve portion 131 being flexible enough so that it can be pushed by the stem 41 to a position where it unseats from the hole 135. The side recesses 133 in the modified output plate are not essential, but in certain designs, prevent whistling.

Various other changes and modifications may be made without departing from the spirit of the invention and all such changes are contemplated as may come within the scope of the following claims.

What I claim is:

1. In a pneumatic relay having a body with a recessed face to provide a supply fluid chamber and having a supply fluid inlet port leading thereto; a flat diaphragm positioned on said face of the body and having an inherently flexible valve flap portion movable in said recess; an output wall having one side positioned against said diaphragm and having an opening therethrough adapted to be sealed by said flap and having an output pressure chamber on its other side in communication with said opening; a movable wall adjacent said other side of said output plate and having an exhaust fitting with a tubular stem providing an exhaust duct, one end of said stem and exhaust duct being positioned to be controlled by said flap; means whereby the other end of said exhaust duct is in communication with the atmosphere; spring means normally urging said movable wall and exhaust fitting stem away from said supply fluid chamber and flap; and controlling means for urging said movable wall in the opposite direction, said stem, when the movable wall is moved in a direction opposing said spring means, being positioned and of such length as to project into said supply fluid chamber to move said valve flap away from the opening of the output pressure chamber, said valve flap being so positioned that during said last-mentioned movement it stays in engagement with the controlled end of the stem so that the exhaust duct of the stem is maintained closed by the supply fluid pressure in the supply fluid chamber and by the inherent flexibility of the flap.

2. In a pneumatic relay having a body with a recessed face to provide a supply fluid chamber and having a supply fluid inlet port leading thereto; a flat diaphragm positioned on said face of the body and having an inherently flexible valve flap portion movable in said recess; an output plate having one side positioned against said diaphragm and having an opening therethrough which is surrounded by a projecting valve seat controlled by said flap and having an output pressure chamber on its other side in communication with said opening; a movable wall adjacent said other side of said output plate and having an exhaust fitting with a stem provided with an exhaust duct, one end of said stem and exhaust duct being positioned to be controlled by said flap; means whereby the other end of said exhaust duct is in communication with the atmosphere; spring means normally urging said movable wall and exhaust fitting stem away from said supply fluid chamber and flap; and controlling means for urging said wall in the opposite direction, said stem, when the movable wall is moved in a direction opposing said spring means, being positioned and of such length as to project into said supply fluid chamber to move said valve flap away from its seat around the opening of the output pressure chamber, said valve flap being so positioned that during said last-mentioned movement it stays in engagement with the controlled end of the stem so that the exhaust duct of the stem is maintained closed by the supply fluid pressure in the supply fluid chamber and by the inherent flexibility of the flap.

3. In a pneumatic relay having a body with a recessed face to provide a supply fluid chamber and having a supply fluid inlet port leading thereto; a flat flexible diaphragm positioned on said face of the body and having a centrally disposed U-shaped slot defining an inherently flexible valve flap movable in said recess; an output plate having one side positioned against said diaphragm and having an opening therethrough adapted to be sealed by said flap and having an output pressure chamber on its other side in communication with said opening; a movable wall adjacent said other side of said output plate and having an exhaust fitting with a stem provided with an exhaust duct, one end of said stem and exhaust duct being positioned to be controlled by said valve flap; means whereby the other end of said exhaust duct is in communication with the atmosphere; spring means normally urging said movable wall and exhaust fitting stem away from said supply fluid chamber and valve flap; and controlling means for urging said wall in the opposite direction, said stem, when the movable wall is moved in a direction opposing said spring means, being positioned and of such length as to project into said supply fluid chamber to move said valve flap away from the opening of the output pressure chamber, said valve flap being so positioned that during said last-mentioned movement it stays in engagement with the controlled end of the stem so that the exhaust duct of the stem is maintained closed by the supply fluid pressure in the supply fluid chamber and by the inherent flexibility of the flap.

4. In a pneumatic relay having a body with a recessed face to provide a supply fluid chamber and having a supply fluid inlet port leading thereto; a flat flexible diaphragm positioned on said face of the body and having oppositely disposed arcuate slots defining an inherently flexible flap portion therebetween which is movable in said recess; an output plate having one side positioned against said diaphragm and having an opening therethrough adapted to be sealed by said flap and having an output pressure chamber on its other side in communication with said opening; a movable wall adjacent said other side of said output plate and having an exhaust fitting with a stem provided with an exhaust duct, one end of said stem and exhaust duct being positioned to be controlled by said flap; means whereby the other end of said exhaust duct is in communication with the atmosphere; spring means normally urging said movable wall and exhaust fitting stem away from said supply fluid chamber and flap; and controlling means for urging said wall in the opposite direction, said stem, when the movable wall is moved in a direction opposing said spring means, being positioned and of such length as to project into said supply fluid chamber to move said valve flap away from the opening of the output pressure chamber, said valve flap being so positioned that during said last-mentioned movement it stays in engagement with the controlled end of the stem so that the exhaust duct of the stem is maintained closed by the supply fluid pressure in the supply fluid chamber and by the inherent flexibility of the flap.

5. In a pneumatic relay having a body with a recessed face to provide a supply fluid chamber and having a supply fluid inlet port leading thereto; an inherently flexible valve flap movably supported in said chamber; body means having one side positioned over said supply fluid chamber and having an opening therethrough adapted to be sealed by said flexible flap and having an output pressure chamber on its other side in communication with said opening; a movable wall adjacent said other side of said body means and having an exhaust fitting with a tubular stem providing an exhaust duct, one end of said stem and exhaust duct being positioned to be controlled by said flap; means whereby the other end of said exhaust duct is in communication with the atmosphere; biasing means normally urging said movable wall and exhaust fitting stem away from said supply fluid chamber and flap; and controlling means for urging said movable wall in the opposite direction, said stem, when the movable wall is moved in a direction opposing said biasing means, being so positioned and of such length as to project into said supply fluid chamber to move said valve flap away from the opening of the output pressure chamber, said flap being so positioned that during said last-mentioned movement it stays in engagement with the controlled end of the stem so that the exhaust duct of the stem is maintained closed by the supply fluid pressure in the supply fluid chamber and by the inherent flexibility of the flap.

References Cited in the file of this patent
UNITED STATES PATENTS

| | | |
|---|---|---|
| 1,500,260 | Otto | July 8, 1924 |
| 2,934,902 | Anderson | May 3, 1960 |
| 3,018,136 | Williams | Jan. 23, 1962 |
| 3,045,605 | Nutten | July 24, 1962 |